L. L. RUGGLES

May 9, 1933. AUTOMATIC TELEPHONE SYSTEM Re. 18,828

Original Filed March 26, 1925 6 Sheets-Sheet 1

Inventor
Leonard L. Ruggles
R. B. Richardson Atty.

L. L. RUGGLES

May 9, 1933. AUTOMATIC TELEPHONE SYSTEM Re. 18,828

Original Filed March 26, 1925 6 Sheets-Sheet 2

Inventor
Leonard L. Ruggles
R. S. Richardson Atty.

L. L. RUGGLES

May 9, 1933. AUTOMATIC TELEPHONE SYSTEM Re. 18,828

Original Filed March 26, 1925 6 Sheets-Sheet 3

Inventor
Leonard L Ruggles
R B Richardson Atty.

L. L. RUGGLES

May 9, 1933. AUTOMATIC TELEPHONE SYSTEM Re. 18,828

Original Filed March 26, 1925 6 Sheets-Sheet 4

Inventor
Leonard L. Ruggles
R. B. Richardson Atty.

L. L. RUGGLES

May 9, 1933. AUTOMATIC TELEPHONE SYSTEM Re. 18,828

Original Filed March 26, 1925 6 Sheets-Sheet 5

Inventor
Leonard L. Ruggles
R. B. Richardson Atty

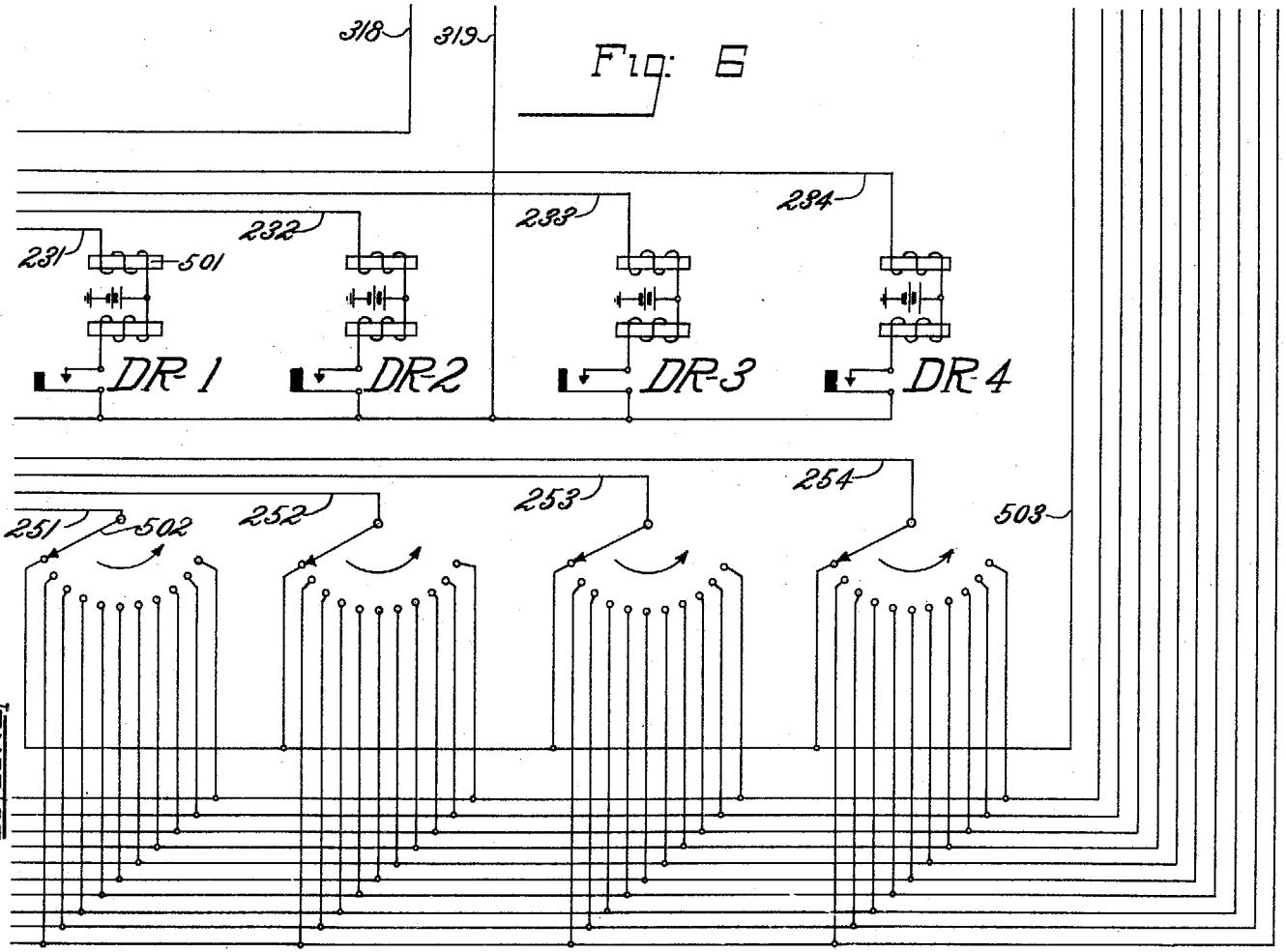
Inventor
Leonard L. Ruggles
R. B. Richardson Att'y

Reissued May 9, 1933 Re. 18,828

UNITED STATES PATENT OFFICE

LEONARD L. RUGGLES, OF WHEATON, ILLINOIS, ASSIGNOR, BY MESNE ASSIGNMENTS, TO ASSOCIATED ELECTRIC LABORATORIES, INC., OF CHICAGO, ILLINOIS, A CORPORATION OF DELAWARE

AUTOMATIC TELEPHONE SYSTEM

Original No. 1,721,640, dated July 23, 1929, Serial No. 18,368, filed March 26, 1925. Renewed October 22, 1928. Application for reissue filed July 9, 1931. Serial No. 549,780.

The present invention relates to automatic telephone systems in general, but is concerned more particularly with automatic telephone systems in which directors are employed to translate the office digits of the telephone numbers into the codes necessary to effect the trunking of the various calls to the desired offices by way of the most suitable paths; and the principal feature of the invention consists in the provision of new and improved circuit arrangements whereby the path over which a director routes a particular call is made dependent upon the busy or idle condition of the trunk groups which may be encountered.

The invention is illustrated herein in connection with a system comprising a multi-office network in which the offices comprising the main network are more or less closely grouped, geographically, and in which there is one small office located at some distance from the main network but connected to the network through the medium of trunk lines run between the outlying office and the nearest office in the network.

It is assumed that the majority of calls originated in the outlying office are local calls. This situation may arise in case the office serves a manufacturing town or other settlement which has only slight business and social connections with the district served by the main part of the network.

By way of example, it is assumed that not more than 2000 lines are used at present in the outlying office and that these lines are reached by way of the fourth and fifth levels of the thousands selectors. Accordingly, in the ordinary procedure, the remaining levels of the thousands selectors would be left dead for the time being. In this case, however, it is proposed to use the thousands selectors for handling all calls, in which case a thousands selector is also an office selector, so to speak, in that it sends a call to one of the two local thousand line groups or to the group of outgoing trunk lines, depending upon the digit transmitted to it.

It has been assumed that, due to the local conditions set forth above, thirty trunk lines combined into one group will handle the traffic originated in the outlying office and intended for the other offices in the network. The ordinary way of securing a thirty-trunk group of trunk lines is to use outgoing secondary line switches and to provide (in the case of plunger type secondary line switches) three separate groups of secondary line switches, each group having access to a separate trunk group of ten trunks each, and to split the outgoing selector bank multiple into as many groups as may be necessary in order to secure a sufficient number of primary trunks to handle the traffic directed to the secondary group. The above arrangement is well known, of course, and it is merely pointed out here in order to contrast it with the arrangement contemplated in the present case.

According to the present invention, three levels (instead of one) of the thousands selectors are taken over for use in connection with the above mentioned group of thirty direct trunks, namely, the third, sixth, and ninth levels, ten trunks being taken from each of the three levels. Now, since directors are used to route the calls, any one director may be cross-connected so as to send all outgoing calls which it handles by way of any one of the three outgoing levels. Accordingly, the directors are split into three groups from this standpoint. The directors of one group are cross connected so that they send calls out over the ninth level; the directors of another group are cross connected so that they send calls out over the sixth level; and the directors of the other group are cross connected so that they send calls out over the third level.

The above is the normal arrangement, but when one level becomes busy, for example, the ninth level, the cross connecting in the directors which normally send traffic out over the ninth selector level is changed by means of a relay arrangement so that the calls are sent out over the sixth level, provided it is not also busy, and are sent out over the third level instead if the sixth level is busy.

In the case of the directors which normally send calls out over the sixth selector level, they are arranged to send their traffic out over the third level in case the sixth level becomes busy, and to send the calls to the ninth level in case the third level is busy also.

Similarly, the directors which normally send calls to the third level are arranged so as to send the calls to the ninth level when the third level becomes busy, provided the ninth level is not also busy, and to send the calls instead to the sixth level if the ninth level is busy.

The arrangement for accomplishing the above results consists in the provision of chain relays. These relays pull up when all the trunks in the respective groups become busy, and the arrangement is such that they control the operation of the various groups of directors to bring about the results above set forth.

Referring now to the drawings, they show by means of the usual circuit diagrams a sufficient amount of the apparatus in a telephone system embodying the principles of the invention to enable the invention to be understood and its utility to be appreciated.

Fig. 1 shows the first selector FS which is accessible to line switches at terminals such as 2, 3, and 4, and which has access to local hundreds selectors and to the three subgroups of outgoing trunk lines. This drawing shows also the trunk circuit TC which is inserted in the trunk line leading to the first selector FS and which has associated therewith the director selector DS.

It will be noted that the circuits of the first selector FS are not shown in full and it is to be understood that any one of several well-known two-wire selector circuits may be used.

Figs. 3–6 show one of the directors accessible to the director selector DS, Fig. 1.

Figure 3:
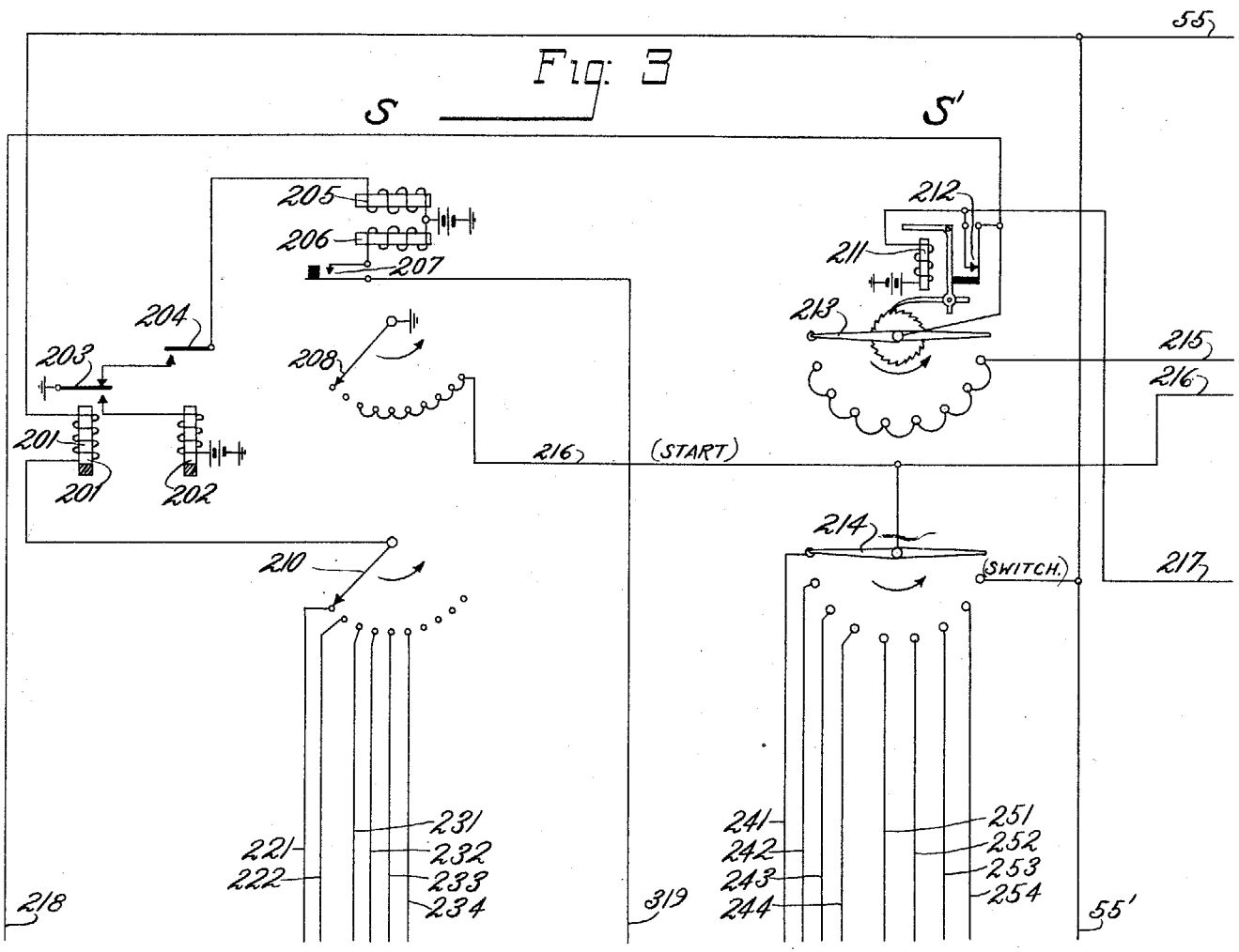

Referring now to Figs. 3–6, the portion of the director shown in Fig. 3 includes the sequence switch S, which is used primarily to connect the incoming impulse conductor to the various operating magnets of the director in the proper order, and it accordingly moves one step at the termination of each series of impulses. This switch is used also to start the operation of the sender, Fig. 4, as soon as the office register OR, Fig. 5, has been set. Fig. 3 shows also the sequence switch S′ which is used primarily to control the order of the transmission of the various digits. This sequence switch is used also to effect the switching-through operation and the consequent freeing of the director, upon the completion of the transmission of a number.

Figure 4:
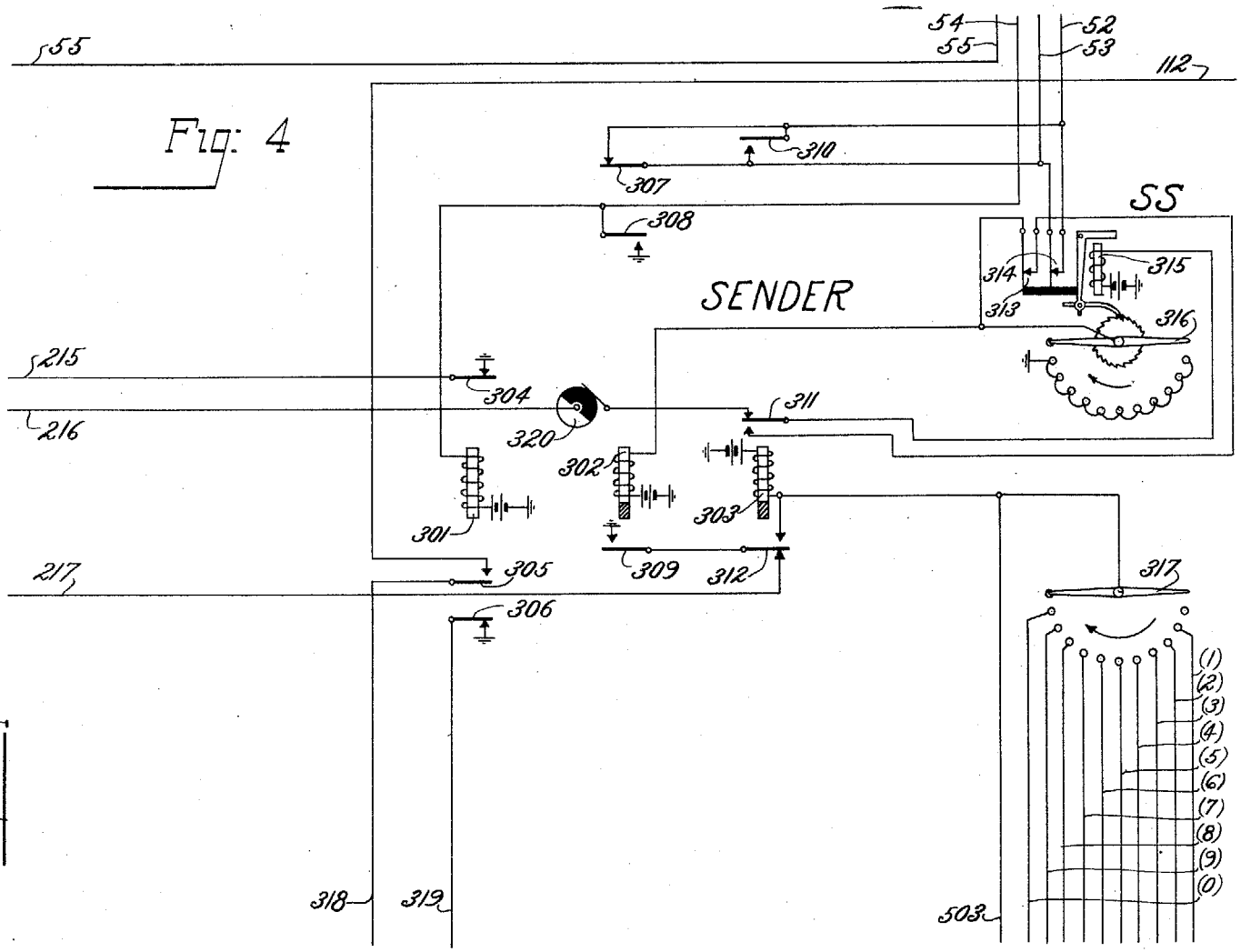

Fig. 4 shows the sender, comprising the interrupter 320, together with relays 302 and 303 and the sending switch SS. This drawing shows also the release relay 301, which energizes when the director is seized and which falls back when the director is freed.

Figure 5:
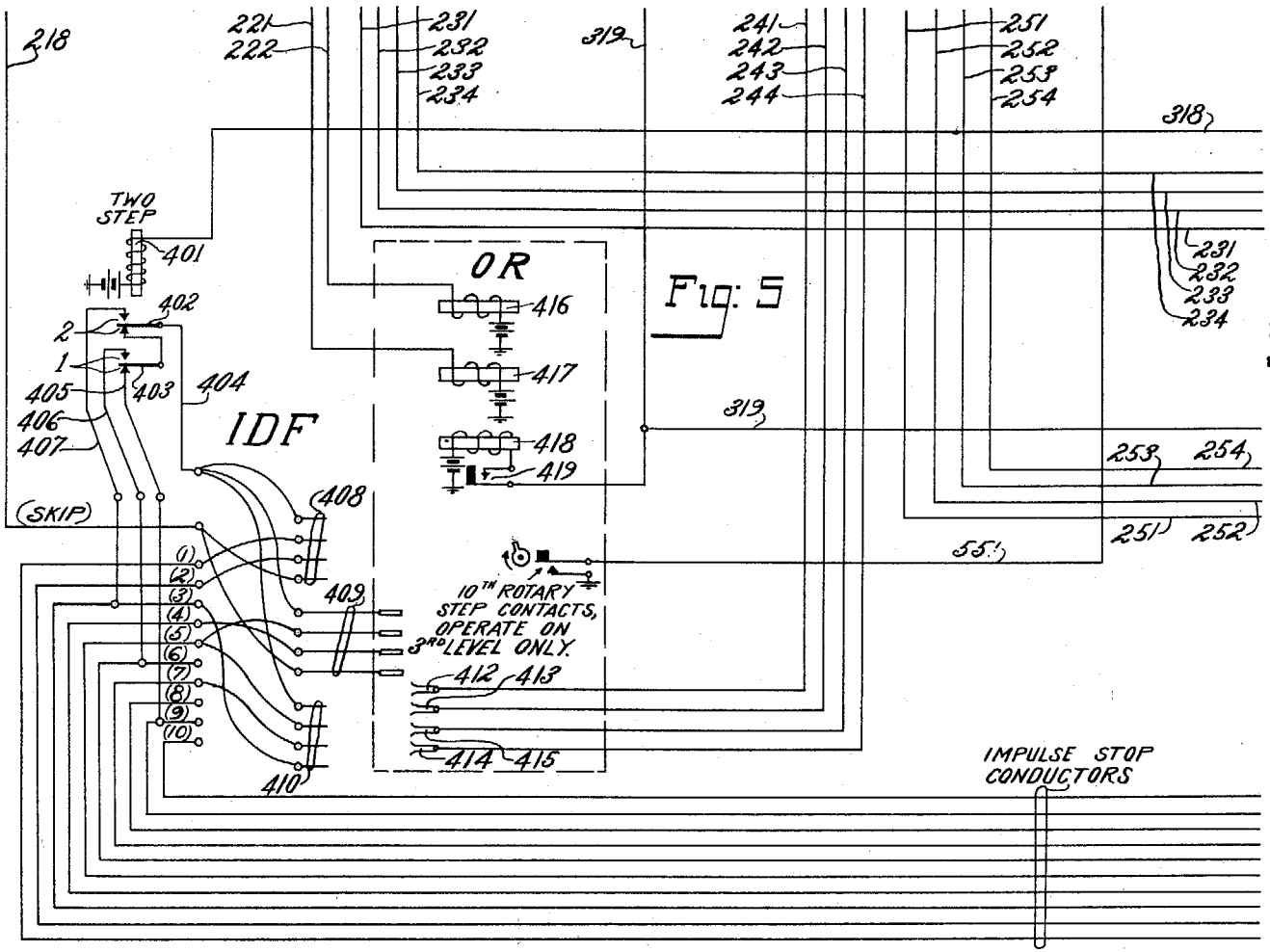

Fig. 5 shows the office register OR which responds to the two office digits of any number to bring the wipers 412—415 into engagement with the set of bank contacts corresponding to the called office.

Fig. 6 shows the digit registers DR—1–DR—4 which respond to the four subscriber digits, respectively, of a number and set their wipers upon the respective impulse stop conductors corresponding to such digits.

The apparatus having been described generally, a detailed description of the operation will now be given. For this purpose it will be assumed that a subscriber, desiring to call a subscriber whose line terminates in the distant office reached by way of the third, sixth, and ninth levels of the first selector FS, removes his receiver.

When this subscriber removes his receiver, his individual line switch operates in the usual manner to select an idle trunk. In this case it will be assumed that the trunk comprising conductors 5—7 and leading to the trunk circuit TC is seized by the calling line switch at the terminals 2—4. When this occurs, line relay 8 of the trunk circuit TC energizes over conductors 5 and 7 and over the calling line. At armature 11, relay 8 closes a circuit for the slow acting release relay 9, which thereupon energizes and places ground upon release trunk conductor 6 at armature 13, thereby establishing the usual holding circuit to maintain the seizing line switch operated after its slow acting line relay has fallen back.

As a further result of the above mentioned operation of the slow acting release relay 9, it connects the test wiper 50 of the director selector DS to the junction of switching relay 4 and stepping magnet 42 at armature 15, and at armature 14 closes a circuit through switching relay 4 and stepping magnet 42 in series. From this point, the operation depends upon whether the director upon which the wipers of the director selector DS are standing is busy or idle. If it is idle, the operation of armature 15 of relay 9 does not produce any particular effect at this time and switching relay 4 energizes, seizing the director.

Assuming, on the other hand, that the director in question is busy, the ground potential encountered upon the busy test contact by test wiper 50 short circuits relay 4 and prevents it from energizing. This ground potential results in the operation of the stepping magnet 42 which interrupts its own circuit at contacts 43 and accordingly operates in a buzzer-like manner to advance the wipers 48—51 step by step in search of an idle director.

When an idle director is reached, which director, it will be assumed, is the one shown in the drawings and reached by way of conductors 52—55, switching relay 4, being no longer short circuited, energizes in series with stepping magnet 42. Stepping magnet 42 does not operate at this time on account of the relatively high resistance of switching relay 4. At armature 46, relay 4 disconnects test wiper 50 from the junction of its own winding and that of magnet 42 and connects it to ground instead, thereby making the seized director busy; at armature 47 it closes a point in the operating circuit; and at armatures 44 and 45 the said relay 4 connects up the wipers 48 and 49, thereby connecting conductors 19 and 21 of the first selector FS to a closed bridge in the seized director including the outgoing control conductors 52 and 53 and contacts 314 of the sender switch SS, Fig. 4, in multiple with armature 307 and resting contact. Accordingly, line relay 22 of the first selector FS operates and closes a circuit for the associated release relay 23 which energizes to prepare the selector for operation.

In the director, release relay 301 energizes over conductor 54 responsive to the grounding of conductor 54 through test wiper 50 by relay 4 of the director selector DS. At armature 304, relay 301 removes ground from the restoring conductor 215 of the sequence switch S′; at armature 306, this relay removes ground from the restoring conductor 319 over which the release magnets of certain of the mechanisms are operated; and at armature 305 it connects conductor 112 to the two-step code-control relay 401. In this case, it will be assumed that there is no ground potential on conductor 112 and that relay 401, accordingly, is not operated at this time.

The circuits are now in readiness for the calling subscriber to dial the digits of the desired number.

When the calling subscriber turns his calling device in accordance with the first office digit, line relay 8 of the trunk circuit TC is deenergized a corresponding number of times and, upon each deenergization, disconnects the operating conductor from switching relay 10 and connects it to ground instead, thereby closing a circuit through the working contact and armature 47, wiper 51, conductor 55, series relay 201, Fig. 3, distributing wiper 210 of the sequence switch S, and conductor 221, for vertical magnet 417 of the office register OR, Fig. 5. Vertical magnet 417 responds to these impulses of current and raises the wipers 412—415, step by step until they come to rest opposite the desired level of bank contacts. Relay 201 is energized in series with vertical magnet 417 upon the first impulse of current and, being slow acting, maintains its armature attracted throughout the series of impulses. At armature 203, relay 201 closes a circuit for the slow acting relay 202, which energizes and prepares at armature 204 a circuit for stepping magnet 205 of the sequence switch S.

At the end of the series of impulses, relay 201 falls back and completes the circuit of magnet 205 at armature 203, whereupon magnet 205 advances wipers 208 and 210 one step and wiper 210 shifts the operating circuit from the vertical magnet to the rotary magnet. A moment later, relay 202 falls back and opens the circuit of magnet 205 at armature 204.

When the calling subscriber dials the next digit, the resulting impulses of current are transmitted to the director over the operating conductors to wiper 210 of the sequence switch S and thence by way of conductor 222 to the rotary magnet 416 of the office register OR. The rotary magnet 416 responds to these impulses of current and advances the wipers 412—415 step by step until they come to rest upon the desired set of contacts, which set, it will be assumed, is the one shown in the drawings and connected to the right hand side of the intermediate distributing frame IDF by the group of conductors 409.

The sequence switch S is operated one step upon the termination of the second digit in the same manner as before and wiper 210 shifts the operating conductor over to conductor 231 leading to the operating magnet 501 of the digit register DR—1.

Since both office digits have now been registered, the sender may be started now to transmit the digits in the office code. Accordingly, wiper 208 of the sequence switch S grounds the start conductor 216 leading to the sender and likewise wiper 214 of the sending control sequence switch S′ thereby starting the sending operation in a manner to be pointed out below.

Responsive to the dialling of the next digit, the digit register DR—1 is operated and the wiper 502 is set upon the impulse stop conductor corresponding to the digit.

Similarly, the digit register DR—2 responds to the next digit; the digit register DR—3 responds to the following digit; and the digit register DR—4 responds to the last digit.

It will be understood, of course, that the sequence switch S operates one step at the end of each of the digits, as before pointed out, in order to connect the operating circuit to the stepping proper magnet in each case to bring about the operation above described. Wiper 210 moves off the contact associated with conductor 234 of the digit register DR—4 and lands on a dead contact upon the termination of the last digit. Wipers 208 and 210 remain in this position until the director is released.

Responsive to the grounding of start conductor 216 by the sequence switch S at the end of the transmission of the second office digit, as above pointed out, ground is intermittently supplied through the interrupter 320 and the resting contact and armature 311 to the stepping magnet 315 of the sending switch SS. Accordingly, the stepping magnet 315 starts to energize and deenergize under the control of the interrupter 320. The first energization of stepping magnet 315 results in the movement of the associated pawl into engagement with the next notch in the wiper driving ratchet wheel. The wipers themselves are not advanced at this time, but are advanced one step upon the subsequent deenergization of magnet 315. When thus occurs, pick-up wiper 316 encounters a ground potential on the first bank contact, thereby closing a circuit for the pick-up relay 302. Relay 302 now energizes and at armature 307 removes the shunt from around the sending contacts 314 of stepping magnet 315. At armature 309 relay 302 places ground on armature 312 of stop relay 303, thereby preparing a locking circuit for the stop relay and closing a circuit over conductor 217 for stepping magnet 211 of the sequence switch S′, which magnet accordingly energizes and moves the associated pawl into engagement with the next notch in the wiper driving ratchet wheel preparatory to advancing the wipers 213 and 214 upon the subsequent energization. As another result of its energization, pick-up relay 302 grounds conductor 54 at armature 308 so as to maintain the director busy and to prevent the premature release of its component switching mechanisms in case the calling subscriber should hang up during the transmission of a digit.

The shunt having been removed from around the sending contacts 314 of stepping magnet 315 of the switch SS at armature 307 of pick-up relay 302, the next energization of stepping magnet 315 results in an opening at the sending contact 314 of the outgoing control circuit including conductors 52 and 53. Upon the following deenergization of the magnet 315, the wipers 316 and 317 advance one step and the outgoing control circuit is again closed at contacts 314. At this time, the stop wiper 317 encounters the first impulse stop conductor so that in case the digit 1 is the one being transmitted, the stop relay 303 will energize over the first stop conductor. The first digit to be transmitted in this case, however, is not the digit 1 but is the digit 9 instead. Accordingly, the sending operation is not stopped at this point but it continues uninterrupted until nine interruptions have been produced in the outgoing control circuit at the sending contacts 314. During the ninth opening in the outgoing control circuit, the stop wiper 317 is standing on the eighth impulse stop conductor. Accordingly, when stepping magnet 315 of the sending switch SS again falls back, it closes the outgoing control circuit at contacts 314 and at the same time advances wipers 316 and 317 another step and wiper 317 encounters the ninth impulse stop conductor. Thereupon a circuit is completed for stop relay 303 as follows: From ground by way of the start conductor 216, stop conductor control wiper 214 of the sequence switch S′, the first code-digit stop conductor 241, wiper 412 of the office register OR, the bank contact upon which it is standing, the upper conductor in the group labeled "409", the associated terminal on the IDF, the IDF jumper connecting this terminal with the terminal in which conductor 404 terminates, conductor 404, armature 402 and its resting contact, armature 403 and its resting contact, and conductor 405 to the ninth impulse stop conductor. From the ninth impulse stop conductor, the circuit continues to the associated contact in the lower bank of the sending switch SS and from thence by way of the stop wiper 317 to battery through stop relay 303. Stop relay 303 energizes over this circuit and at armature 310 places a shunt around the sending contacts 314, thereby terminating the transmission of the digit. At armature 312, relay 303 removes ground from conductor 217 and closes a locking circuit for itself.

Responsive to the removal of ground from conductor 217, stepping magnet 211 of the sequence switch S′ deenergizes and advances the wipers 213 and 214 one step. Wiper 214 disconnects ground from the first code digit stop conductor 241 and places ground on the second stop conductor 222.

As another result of its energization, stop relay 303 disconnects stepping magnet 315 of the sending switch SS from the interrupter 320 and connects it instead through the local interrupter contacts 313 to wiper 316. Magnet 315 is self-interrupting in this circuit. Accordingly, magnet 315 operates in a buzzer-like manner to advance the wipers 316 and 317 to their normal position.

When the normal position is reached, wiper 316 encounters an ungrounded contact, whereupon the operation of magnet 315 ceases and the circuit of pick-up relay 302 is opened. Relay 302, however, being slow acting, does not deenergize for the time being.

Figure 1:
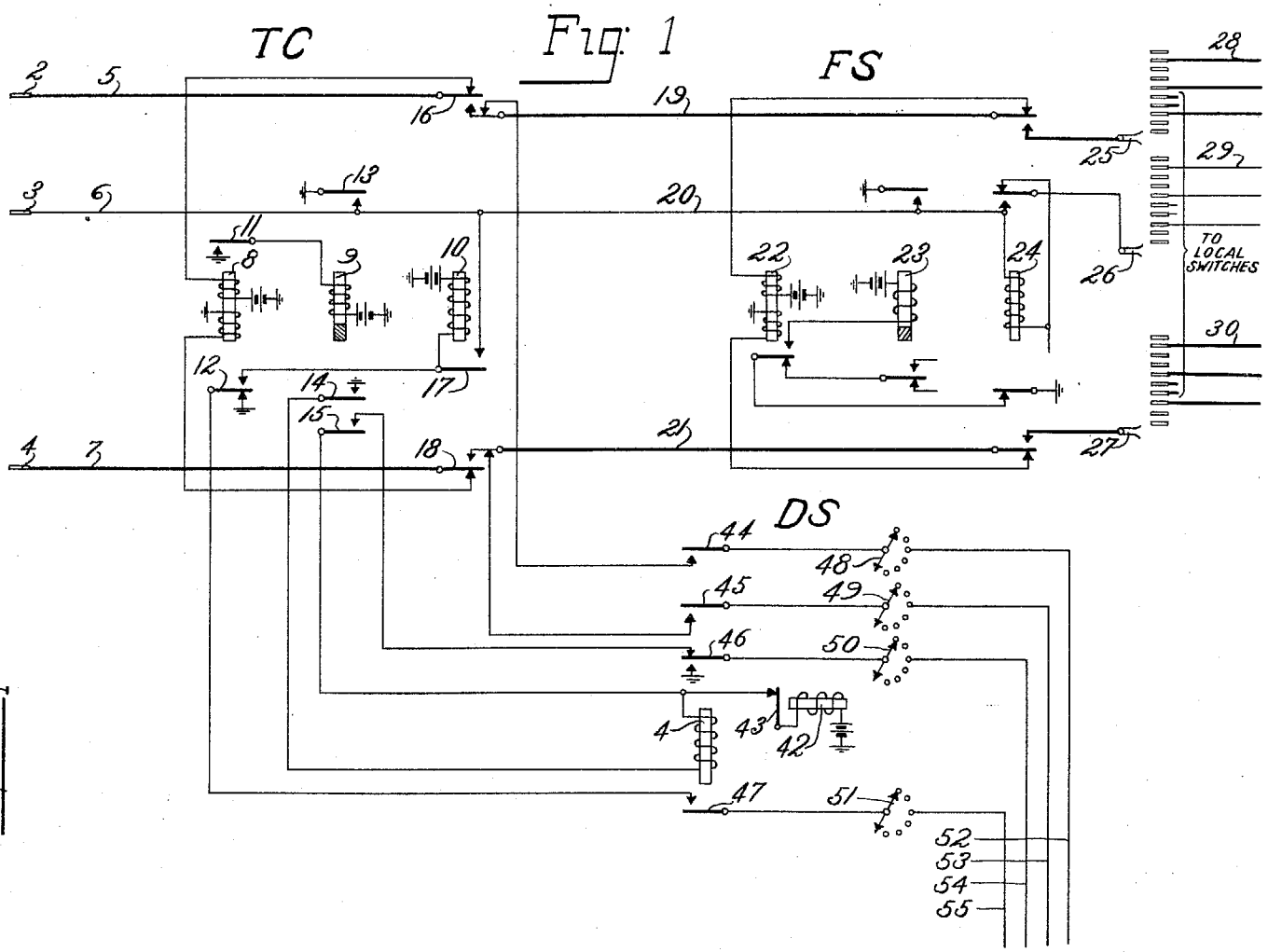

In the first selector FS, Fig. 1, line relay 22 falls back once for each interruption produced in its circuit by the director as above pointed out, with the result that the selector is operated in the usual manner to bring its wipers 25—27 opposite the ninth level of bank contacts.

Figure 2:
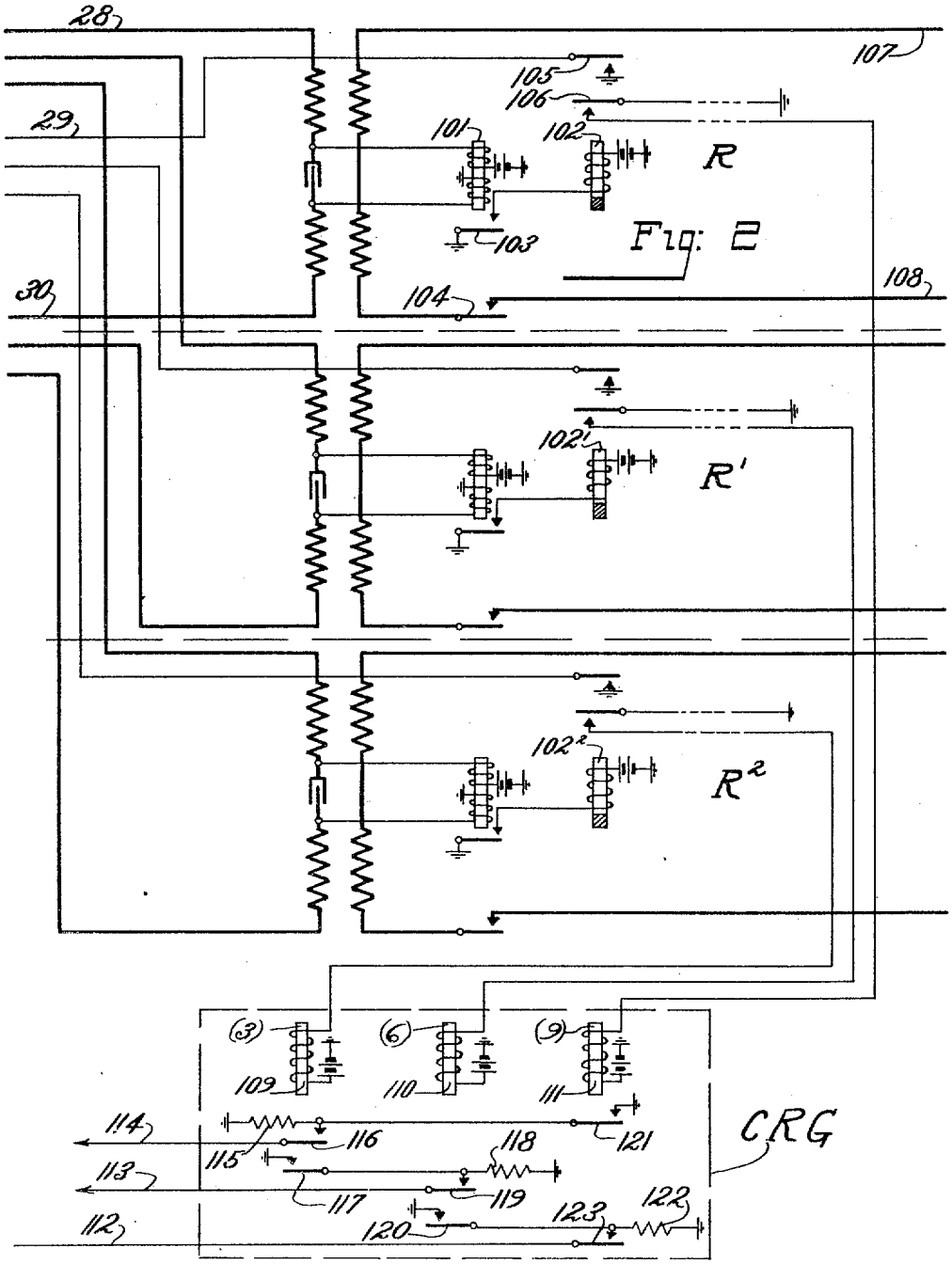
Fig. 2 shows the repeaters R, R′ and $R^2$ inserted in three outgoing trunk lines, one trunk line in each of the three outgoing subgroups, together with the chain relay group CRG comprising the chain relays 109, 110, and 111, which are used to control certain trunking operations of the directors.

At the end of the vertical movement of the first selector FS, the usual automatic trunk hunting operation is initiated in the usual manner with the result that wipers 25—27 are brought into engagement with an idle trunk, which trunk, it will be assumed, is the one comprising conductors 28—30 and extending to the repeater R, Fig. 2. That being the case, conductors 19 and 21 are extended through to the wipers 25 and 27 and to conductors 28 and 30 upon the operation of switching relay 24 when the idle trunk is reached. Also, test wiper 26 is disconnected from the test circuit and is connected instead to the grounded release trunk conductor 20, thereby making the seized trunk busy immediately.

Responsive to the connecting up of the line wipers of the first selector FS, line relay 101 of the repeater R, Fig. 2, energizes through the left hand repeating coil windings and over conductors 28 and 30 and closes at armature 103 a circuit for release relay 102. When this occurs, relay 102 pulls up and places ground on release trunk conductor 29 at armature 105 so as to maintain the connection established after the release relay 23 of the first selector FS has fallen back as it shortly does and after release relay 9 of the trunk circuit TC has fallen back, which will take place upon the switch-through operation of the director, as will be pointed out subsequently.

In the repeater R, as a further result of the energization of release relay 102, it closes at armature 106 a point in the circuit of chain relay 111 in the chain relay group CRG. This, however, does not result in the energization of relay 111 unless all the other repeaters accessible to the first selector FS from the ninth level are busy.

As a still further result of the energization of the line relay 101 of the repeater R, it closes at armature 104 a bridge cross conductors 107 and 108 through the right hand repeating coil winding. When this occurs, the selector switch in which conductors 107 and 108 terminate in the distant office is prepared for operation in the usual manner.

In the director, relay 302 falls back after the interval for which it is adjusted, and at armature 309 opens the locking circuit of relay 303. Relay 303, however, being slow acting, does not fall back for an interval. It may be pointed out that the interval of time required for relays 302 and 303 to fall back one after the other is sufficient to permit the trunk hunting operation of the selectors to take place.

When relay 303 falls back, it disconnects stepping magnet 315 from the self-interrupting circuit and connects it instead to the interrupter 320, whereupon stepping magnet 315 again starts to operate under the control of the interrupter 320 and the second digit in the number is transmitted in a manner similar to the first digit.

By referring to the intermediate distributing frame IDF, Fig. 5, it may be seen that the second bank contact in the group upon which the wipers of the office register OR are now standing is cross connected to the fifth impulse stop conductor. Accordingly, stop relay 303 energizes and terminates the second digit when five impulses have been transmitted. The circuit over which conductor 303 operates is as follows: From ground by way of the stop-conductor-control wiper 214 of the sequence switch S′, the second code digit stop conductor 242, wiper 413, the bank contact upon which it is standing, the associated jumper on the intermediate distributing frame IDF, the fifth impulse stop conductor, the associated contact in the sending-switch bank, stop wiper 317, and stop relay 303 to battery. The energization of stop relay 302 results in the termination of the second digit in the same manner as the first, and the sequence switch S′ advances one step, thereby disconnecting ground from the code-digit stop conductor 242 and connecting it instead to the third code digit stop conductor 243.

Responsive to the transmission of the second code digit, the incoming selector in use in the distant office raises its wipers opposite the fifth level of bank contacts and selects an idle office selector, either in the same office or in still another office, depending of course upon the trunking arrangement.

After the usual interval, relays 302 and 303 both fall back and the third code digit is transmitted in the same manner as the two preceding digits.

Upon referring to the intermediate distributing frame IDF, it may be noted that the third bank contact of the set in use is cross connected on the intermediate distributing frame to the fourth impulse stop conductor. Accordingly, the third code digit is the digit 4, and the stop relay 303 of the sender is energized through the third code-digit stop conductor 243, wiper 414, the jumper on the intermediate distributing frame and the fourth impulse stop conductor to terminate the digit as soon as four interruptions have been produced in the outgoing control circuit.

The advance of the sequence switch S′ takes place in the usual manner upon the energization of stop relay 303. Accordingly, wiper 214 removes ground from the third code-digit stop conductor 243 and places ground upon the fourth code-digit stop conductor 244. In this case, there are only three digits in the code of the called office. Therefore, the fourth code-digit stop conductor is not used to terminate a digit, but it is, nevertheless, necessary to advance the sequence switch S′ through its fourth code-digit position. Accordingly, the bank contact engaged by wiper 415 is cross connected on the intermediate distributing frame IDF to the skip conductor 218. That being the case, when the fourth wiper 415 is grounded over conductor 244, ground is extended across the intermediate distributing frame to the skip conductor 218 and thence through the self-interrupting contacts 212 to the stepping magnet 211 of the sequence switch S′. Stepping magnet 211 energizes and interrupts its own circuit, whereupon it deenergizes and advances the wipers 213 and 214 one step. Wiper 214 accordingly removes ground from conductor 244 and extends it to the first subscriber-digit stop conductor 251.

Responsive to the transmission of the third code digit, the office selector seized at the end of the second code digit raises its wipers opposite the fourth level and selects a trunk line extending to a thousands selector in the desired office.

In the director, the sender now transmits the four subscriber digits, one after the other, with the usual interval between the digits introduced by the slow action of the relays 302 and 303, the four subscriber-digit stop-conductors 251—254 being grounded one after the other in order by the sequence switch S′ under the control of the sending switch.

At the end of the transmission of the fourth subscriber digit, wiper 214 advances from its eighth position to its ninth position, thereby removing ground from the fourth subscriber digit stop conductor 254 and placing ground upon the switching branch 55′ of the operating conductor 55. When this occurs, a circuit is closed over conductor 55 through the contact and wiper 51 of the director selector DS, armature 47 and its working contact, and armature 12 and its working contact for switching relay 10 of the trunk circuit TC. Switching relay 10 energizes over this circuit and locks itself to the grounded release trunk conductor at armature 17, and at armatures 16 and 18 disconnects conductors 5 and 7 from line relay 8 and extends them to conductors 19 and 21, at the same time disconnecting conductors 19 and 21 from the outgoing control circuit of the director, thereby leaving the established connection under the direct control of the calling line.

Line relay 8 now falls back and opens the circuit of release relay 9 at armature 11. Accordingly, release relay 9 deenergizes after the interval for which it is adjusted and removes ground from the release trunk conductor at armature 13, leaving the established connection held by ground supplied to the release trunk conductor at the repeater R, Fig. 2. At armature 15, relay 9 opens a further point in the connection previously existing between test wiper 50 and the junction of relay 4 and stepping magnet 42 of the director selector DS, and at armature 14 disconnects ground from switching relay 4, whereupon relay 4 falls back and frees the director.

In the director, relay 301 falls back responsive to the removal of ground from the release trunk conductor 54 when the director is freed. At armature 304, relay 301 places ground on the restoring conductor 215 thereby closing a circuit through wiper 213 and contacts 212 for the stepping magnet 211 of the sequence switch S′. When this occurs, the self-interrupting stepping magnet 211 advances the wipers 213 and 214 through their remaining step to their normal position.

At armature 306, relay 301 grounds the release conductor 319, thereby supplying current for operating the release magnets of the digit registers DR—1–DR—4; the release magnet of the office register OR; and the release magnet of the sequence switch S. Accordingly, the release magnets mentioned operate and restore the respective switches to their normal position. For example, release magnet 418 of the office register OR operates through off normal contacts 419, and release magnet 206 of the sequence switch S operates through off normal contacts 207. The circuits of the various release magnets are opened in the usual manner at the respective associated off normal contacts.

At armature 305, relay 301 disconnects conductor 112 from conductor 318.

Regarding relays 302 and 303, it may be pointed out that relay 302 obviously falls back prior to the deenergization of relay 301 and removes ground from conductor 54 at armature 308 to permit relay 301 to fall back. Relay 303 falls back because its locking circuit is opened at armature 309 of relay 302.

The desired connection has now been completed in the called office through the medium of a thousands selector, a hundreds selector, and a connector, and the called subscriber's bell is rung in the usual manner provided the line is idle, in which case the conversation takes place in the usual manner when the called subscriber responds.

When the calling subscriber replaces his receiver at the end of the conversation, line relay 101 of the repeater R, Fig. 2, falls back and opens the bridge across conductors 107 and 108 at armature 104, with the result that the connection extending to the distant office is released in the usual manner. At armature 103, line relay 101 opens the circuit of release relay 102 which deenergizes after the usual interval and opens at armature 106 a point in the circuit of chain relay 111. At armature 105, relay 102 removes ground from release trunk conductor 29, whereupon the first selector FS releases in the usual manner and switching relay 10 of the trunk circuit TC falls back. The entire connection is now released. Assuming now that all trunks accessible to the first selector FS on the ninth level are busy, the release relays of all the repeaters of such trunks, including the release relay 102 of the repeater R, are energized and a chain circuit is completed for the ninth level chain relay 111 of the chain relay group CRG. When this occurs, relay 111 energizes and connects ground through the resistance 122 to conductor 112 at armature 123. In case the director shown in Figs. 3–6, is seized at this time, the two-step relay 401, Fig. 5, energizes over conductor 112, through the working contact and armature 305, and over conductor 318. This relay operates through its first step only at this time, due to the fact that it is energized through resistance 122, Fig. 2. Accordingly, the first step armature 403 is operated, but the second step armature 402 is not operated. Armature 403 disconnects conductor 404 from the ninth impulse stop conductor and connects it to the sixth impulse stop conductor by way of the conductor 406. Accordingly, the first digit to be transmitted (in case the call is an outgoing one) is the digit 6 instead of the digit 9 and in case the first selector FS is the one in use, this selector raises its wipers opposite the sixth level (instead of opposite the ninth level) and selects an idle trunk line in the group to which the repeater R′ belongs.

Assuming now that all the sixth level trunks become busy, all the release relays of the various repeaters associated with these trunks, including release relay 102′ of the repeater R′, are energized. Accordingly, a chain circuit is closed for chain relay 110 of the chain relay group CRG. That being the case, relay 110 pulls up and short circuits the resistance 122 at armature 120 and, in case the ninth level chain relay 111 is energized, direct ground is placed on conductor 112, with the result that the two-step relay 401, Fig. 5, is operated in case the director shown in the drawings is taken for use at this time. Relay 401 operates through both its first step and its second step at this time and at armature 402 connects conductor 404 to the third impulse stop conductor by way of conductor 407, thereby pre-determining that the first digit to be transmitted in case an outgoing call is made at this time is the digit 3.

It will be understood, of course, that the chain relays are provided with sufficient contacts to enable a conductor similar to 112 to be provided for each of the directors in the group which normally transmits the digit 9 to send the outgoing calls out over the ninth level of the first selectors.

Regarding the directors in the group which normally transmits the digit 6, it may be pointed out that conductor 113, Fig. 2, extends to one of the directors in this group and corresponds to conductor 112 in its manner of connection in the director to which it extends. It will be noted that when the sixth level chain relay 110 pulls up, ground is placed on conductor 113 at armature 119, through the resistance 118, so as to pull the two-step code-changing relay in the associated director half way in case the director is in use, thereby shifting the stop circuit so that the first outgoing digit to be transmitted is the digit 3 instead of the digit 6.

It will be noted that when the third level chain relay 109 is operated simultaneously with the energization of relay 110, direct ground through armatures 117 and 119 is placed on conductor 115, so as to pull the code changing relay in the associated director all the way up to shift the stop circuit so that the first outgoing digit to be transmitted is the digit 9.

The conductor 114 is typical of the control conductors of the third group of directors, i. e., the group which normally transmits calls to the third level of the first selectors. When the third level chain relay 109 pulls up, ground through resistance 115 is placed on conductor 114 at armature 116 so as to operate the code changing relay of the associated director half way in case the director is in use and this shifts the stop circuit so that the first outgoing digit to be transmitted is the digit 9 instead of the digit 3.

It will be noted that in case the third and ninth level chain relays 109 and 111 are operated simultaneously, ground through armatures 121 and 116 in series is placed on conductor 114 to pull up the associated chain relay all the way to shift the stop circuit so that the digit 6 is the first outgoing digit to be transmitted in case the associated director is in use at this time.

It will be appreciated, of course, that the conductors 113 and 114, like the conductor 112, are each individual to one director and that sufficient conductors connected similarly must be provided to take care of the remaining directors in these two groups.

In order to explain still another function of the director shown in the drawings, it will be assumed that the trunk extending through the trunk circuit TC to the first selector FS is seized at the bank contacts 2—4, and that when the director selector DS operates it seizes the director shown in the drawings, which is accordingly prepared for operation in the usual manner. It will be assumed further that the number assigned to the local office is 30 and that the calling subscriber is calling a local line. Accordingly, the calling subscriber dials the two office digits 3 and 0 assigned to the local office. The office register OR raises its wipers 412—415 opposite the third level of bank contacts responsive to the first office digit 3.

Responsive to the second office digit 0, the office register OR rotates its wipers step by step until they land upon the tenth set of bank contacts (not shown) in the third level. When this occurs, the tenth rotary step contacts, Fig. 5, (which operate on the third level only) connect ground to the switching branch 55′ of the operating conductor 55, thereby closing the usual switching circuit for switching relay 10 of the trunk circuit TC. That being the case, switching relay 10 operates with the result that the call is switched through to the unoperated first selector FS and the director shown in the drawings is freed in the usual manner.

When the subscriber dials the thousands digit, either 4 or 5, the first selector FS operates as a thousands selector to select an idle hundreds selector in the elected thousands group.

When the calling subscriber dials the three remaining digits in the desired number, the seized hundreds selector and a connector switch are operated to extend the connection to the desired local line.

The foregoing arrangement is particularly desirable in a situation like the one assumed in the present case, because, in this case, the ratio of local calls to outgoing calls is very large and, since no director is needed to route the local calls, (the director being freed immediately upon the termination of the dialling of the office digits on local calls), the number of directors required is very greatly reduced.

Reference will now be had again to Fig. 5 in order to explain that the armatures 402 and 403 of the two-step code-changing relay 401 may be used to change the same digits in as many codes as desired. For example, the same group of outgoing trunk lines is used for calls to all the distant offices but each office has its own code. However, these codes all have the same first digit and, as may be expected, the first code digit stop conductor is cross connected on the intermediate distributing frame IDF to the common terminal in which conductor 404 terminates. For example, the contact associated with the first of the conductors in the group 409 is cross connected to the above mentioned common contact, as hereinbefore explained, and the two other groups shown, namely, 408 and 410 have their first conductors cross connected to the above-named common contact. Although no other contact groups representing individual positions of the office register OR are shown, it will be assumed that the remaining bank contact sets are cross connected on the IDF in the same way as regards the first code digit position, and it will be understood that the other contacts of such sets are cross connected in accordance with the remaining digits in the respective office codes.

What is claimed is:

1. In a telephone system, an automatic switch, a plurality of groups of lines accessible to said switch, a sending apparatus for transmitting impulses to bring said switch into operative relation with one of said groups of lines, and means responsive to the condition of all lines in said group being busy for altering said sending apparatus before it starts so that it will send a different series of impulses to bring said switch into operative relation with another one of said plurality of groups of lines.

2. In a telephone system, a director including a register switch and a sender, an automatic switch, means operated during the course of a call for extending a connection to said automatic switch and for temporarily associating said director with said automatic switch, means for operating said register switch over the calling line, said sender being subsequently controlled by said register switch to transmit a digit to said switch in accordance with the position assumed by said register switch, and means controlled in accordance with the condition of the trunk lines accessible to said switch for modifying the register control to cause said sender to transmit a different digit to said switch.

3. In a telephone system, a first office, a second office, two groups of trunk lines extending from said first office to said second office, a director in said first office normally set to translate the office designation of said second office into a code which will trunk a call over a trunk line in the first of said groups, and means effective in case all the trunks of said first group are busy for changing said code before transmission so that the call will be trunked over a trunk line in the second of said groups.

4. In a telephone system, a first office, a second office, three groups of trunk lines extending from said first office to said second office, a director in said first office normally set to translate the office designation of said second office into a code which will trunk a call over a trunk line in the first of said groups, means responsive to a busy condition of said first group for changing the code before transmission to cause the call to be trunked over a trunk line in the second group, and means responsive in case both the first and second groups are busy for changing the code a different way so as to trunk the call over a trunk line in the third group.

5. In a telephone system, a first office, a second office, three groups of trunk lines extending from said first office to said second office, a director in said first office normally set to translate the office designation of said second office into a code which will trunk a call over a trunk line in the first of said groups, and means responsive to the busy condition of said first group for changing the code before transmission to cause the call to be trunked over a trunk line in one of the other groups.

6. In a telephone system, a first office, a second office, a plurality of groups of trunks extending from the first office directly to the second office, a plurality of groups of directors in said first office, the directors of the first group being arranged to extend calls to the second office via the first group of trunks, the directors of the second group being arranged to extend calls to the second office via the second group of trunks, etc., and means effective in case any group of trunks is busy for changing the directors in the corresponding group so that they will trunk calls to said second office via an idle group of trunks.

7. In a telephone system, an automatic switch, a plurality of groups of lines accessible to said switch, a sending apparatus for transmitting impulses to bring said switch into operative relation with one of said groups of lines, and means controlled in accordance with traffic conditions in said groups of lines for altering said sending apparatus before it starts so that it will send a different series of impulses to bring said switch into operative relation with another one of said plurality of groups of lines.

8. In a director for controlling automatic switching apparatus in trunking calls through trunk-line groups, a distributing frame comprising register terminals and stop conductor terminals, jumpers connecting certain of said terminals, and means including a relay for shifting a particular register terminal from one stop conductor terminal to another, said means being controlled in accordance with traffic conditions in one of said trunk-line groups.

9. In a director for controlling automatic switching apparatus, a distributing frame comprising register terminals and other terminals adapted to be connected together by jumpers, and means including a relay controlled in accordance with traffic conditions in said automatic switching apparatus for controlling a jumper connection.

10. In a telephone system wherein automatic switching apparatus is controlled by a plurality of register senders to direct calls through a plurality of groups of trunk lines, means responsive to a heavy traffic condition in one of said groups of trunk lines for altering the register senders so that calls which would otherwise be directed toward such group of trunk lines are instead diverted to a different group.

11. In a telephone system, a plurality of groups of trunk lines, automatic switching apparatus arranged to extend connections over said trunk lines, register senders arranged to control said automatic switching apparatus, a group of relays arranged to operate in accordance with traffic conditions in said trunk line groups, a plurality of conductors extending directly from said relays to said register senders, and means controlled over said conductors by said relays for altering the control exercised on the switching apparatus by the register senders.

12. In a telephone system, a plurality of automatic switches having access to a group of trunk lines, a register sender arranged to control any one of said switches to bring it into operative relation with said group of trunk lines so that the switch may extend a connection to an idle one of them, and means responsive to a busy condition within said group of trunk lines for preventing said register sender from directing said switch into operative relation with the busy group.

13. In a telephone system wherein automatic switching apparatus has access to groups of trunk lines and is controlled by register senders, means responsive to a busy condition in a group of trunk lines for causing the register senders to guide said switching apparatus so that it is not brought into association with the busy group of trunk lines.

14. In a telephone system wherein automatic switching apparatus is operated under the control of register senders to complete connections over trunk-line groups, means responsive to an abnormal traffic condition in one of said trunk-line groups for effecting a given change in the directing apparatus of one of said register senders and for effecting a different change in the directing apparatus of another register sender.

15. In a telephone system wherein automatic switching apparatus operates under the control of register senders to trunk telephone calls through trunk line groups, register senders being divided into a plurality of groups, and means responsive to a heavy traffic condition within a given trunk line group for producing alterations in each of said groups of register senders, the alteration being different in each group.

16. In a register sender for use in a telephone system to operate automatic switching apparatus by transmitting digits thereto to route calls through trunk-line groups, a digit conductor in said register sender, registering means for effecting a connection with said conductor, sending means responsive to such connection being made for sending a predetermined digit to the automatic switching apparatus, and means responsive to a heavy traffic condition within a trunk group for altering the register sender that the sending apparatus is controlled over the said connection to said conductor to send out a different digit to the automatic switching apparatus.

17. In an automatic telephone exchange system, two register senders, a group of automatic switches arranged to be controlled by said register senders, said automatic switches having multipled bank contacts arranged in groups corresponding to different digit values, digit connections in the first register sender effective when a given designation is set up therein for causing one of said automatic switches to be driven into association with a group of bank contacts corresponding to a first digit-value, digit connections in the second register sender effective when the same designation is set up therein for causing one of said automatic switches to be driven into association with a contact group corresponding to a second digit-value, and trunk lines extending from the contacts having the said first and second digit-values to the same numerical group of the exchange.

18. In a telephone exchange system, a group of multi-level selector switches, a group of trunks accessible through a plurality of levels of said selector switches and having a common designation assigned thereto, register senders equal in number to said plurality of levels and corresponding thereto, respectively, means for associating any one of said register senders with any one of said switches, and means effective when the said common designation is set up in any one of said register senders for operating the associated one of said automatic switches into association with the level thereof which corresponds to the register sender in use, so that the level of contacts with which connection is made in response to the said designation is dependent upon the register sender on which said designation is set up.

19. In a telephone exchange system, a group of selector switches having multipled bank contacts divided into groups corresponding to different digit values, said selector switches being arranged to extend connections responsive to designations transmitted to the exchange from calling lines, means including register senders interposed between said calling lines and said selector switches for transmitting different digit values to said selectors responsive to the same designation, whereby the selectors are variously positioned on a plurality of contact groups, and separate trunk lines extending from each of the last-named contact groups to the same numerical group of the exchange.

20. In a telephone system, two exchanges, selectors in the first exchange, a plurality of groups of trunks accessible to said selectors and extending to the second exchange, a group of directors in the first exchange, means responsive to the removal of the receiver on a line in said first exchange for selecting an idle selector and for connecting up an idle director, means for registering the designation of the second exchange in any connected director, means in such director for transmitting a digit to operate the first selector into association with one of said groups of trunk lines, and a plurality of different translating circuits in said directors whereby the digits transmitted to said first selector on successive calls are varied depending on the director used in each call in order to distribute the traffic to said plurality of groups of trunk lines.

21. In a telephone exchange, a group of selectors, a group of directors, subscribers' lines, means responsive to a calling signal on a subscriber's line for temporarily associating a director with such line, means for registering an exchange designation in said director, means in said director responsive thereto for sending a digit to one of said selectors, means responsive to the same identical calling signal on another of said subscribers' lines for associating another one of said directors therewith, and means in the second director responsive to the registration of the same exchange designation for sending a different digit to said selector.

22. The method of securing a large group of trunks without secondary line switches, in a system using selectors having bank contacts divided into groups which are smaller than the trunk group desired, which consists in assigning the trunks of the large group to a number of selector bank groups, in providing directors to operate the selectors to select said bank groups, in routing calling lines to said directors in random fashion so that any calling line may use any director, and in translating the designation of the said large trunk group differently in the different directors, there being as many different translations used as there are selector bank groups assigned to said trunks.

In witness whereof, I hereunto subscribe my name this 12th day of June, A. D. 1931.

LEONARD L. RUGGLES.